US00RE35380E

United States Patent [19]

Rea et al.

[11] E Patent Number: Re. 35,380

[45] Reissued Date of Patent: Nov. 26, 1996

[54] TILE MOUNTING SYSTEM

[76] Inventors: Philip L. Rea, "Melleray", 7a Hillcrest Road, Ealing, London W5 2JL; Stanley R. Bagshaw, 19 Georgewood Road, Hemel Hempstead, Hertfordshire HP3 8AL, both of England

[21] Appl. No.: 813,343

[22] Filed: Dec. 24, 1991

Related U.S. Patent Documents

Reissue of:

[64] Patent No.: 4,888,928
Issued: Dec. 26, 1989
Appl. No.: 165,917
Filed: Mar. 9, 1988

U.S. Applications:

[63] Continuation of Ser. No. 873,346, Jun. 12, 1986, Pat. No. 4,761,926.

[30] Foreign Application Priority Data

Jun. 21, 1985 [GB] United Kingdom ..... 8515769

[51] Int. Cl.[6] ..... E04F 13/08

[52] U.S. Cl. ..... 52/387; 52/389

[58] Field of Search ..... 52/385, 386, 387, 52/388, 389, 180, 181

[56] References Cited

U.S. PATENT DOCUMENTS

| | | |
|---|---|---|
| 421,742 | 2/1890 | Marsh . |
| 903,183 | 11/1908 | Eggers . |
| 4,026,083 | 5/1977 | Hoyt et al. . |
| 4,761,926 | 8/1988 | Rea et al. . |

FOREIGN PATENT DOCUMENTS

| | | |
|---|---|---|
| 2065207 | 7/1971 | France . |
| 3333780 | 3/1984 | Germany . |
| 712127 | 7/1966 | Italy . |

*Primary Examiner*—Lanna Mai
*Attorney, Agent, or Firm*—Harness, Dickey & Pierce, P.L.C.

[57] ABSTRACT

A synthetic plastics or other flexible but substantially inextensible tiling matrix 1 is provided definning an apertured portion 2 formed with openings 3, half-sized openings 5, and quarter-sized openings 4, one surface of the matrix portion 2 being provided with cruciform and rectilinear projections 9 between which tiles can be installed. The matrix 1 is secured to a wall or other surface that is to be tiled by use of an adhesive and the tiles are secured to that wall or other surface and to the matrix portion 2 by a conventional tiling adhesive following which grouting is installed between the regularly spaced apart tiles in a conventional manner. The projections 9 have a projecting extent that is less than the thickness of the tiles so that they will be concealed after grouting has been completed. Edges of each matrix portion 2 are provided with interlocking projections 6 and recesses 7 so that one matrix portion 2 can quickly and accurately be positioned in line relative to others. Projections 8 are provided to assist in alignment relative to the edges of walls, floors, ceilings and other surfaces and any guide lines that may be marked thereon. Areas of the matrix 1 that incorporate a lip to finish the free edge of the tiled area and areas thereof that are hingedly interconnected to flank angular corners between walls or other surfaces are both described and illustrated.

2 Claims, 3 Drawing Sheets

TILE MOUNTING SYSTEM

Matter enclosed in heavy brackets [ ] appears in the original patent but forms no part of this reissue specification; matter printed in italics indicates the additions made by reissue.

CROSS REFERENCE TO RELATED APPLICATION:

This application is a continuation application of the co-pending U.S. patent application, Ser. No. 06/873,346, filed Jun. 12, 1986, U.S. Pat. No. 4,761,926 the disclosure of which is hereby incorporated by reference.

This invention relates to a system for the mounting of tiles on vertical, horizontal or oblique surfaces and can thus be employed in the tiling of walls, floors, ceilings and other surfaces which are inclined both to the vertical and the horizontal. It is conventional for tiles, and particularly glazed ceramic tiles, to be fixed to flat surfaces by an adhesive which is appropriate to the nature of the tiles themselves and the surface upon which they are to be mounted, the tiles being uniformly spaced apart from one another by relatively short distances and the spacing between them being filled by so-called "grouting" to produce the neat and pleasing finish which is well known to everyone. Experienced professional tilers can apply tiles to a large area at a rapid rate and will produce the finish that has just been mentioned with very few, if any, blemishes or noticeable irregularities. However, when the amateur tiler attempts a similar job, he/she discovers that the work of the professional tiler is much more difficult than it appears and cannot be easily duplicated without a lot of experience and the acquisition of "know-how" for which the mere reading of instructive literature is no substitute even though it may be of some help.

According to the invention, there is provided a tiling system characterized in that is comprises the provision of a matrix defining an apertured portion for adhesive attachment to a surface that is to be tiled, the apertured portion being either permanently provided with, or being constructed to receive, a pattern of projections whose sizes and positions are such that, in use, tiles can fit between the projections and be adhesively secured to said surface by way of the apertured portion and the openings therein whilst being regularly spaced apart from one another by said projections to facilitate uniform grouting between the tiles.

Figure 1:
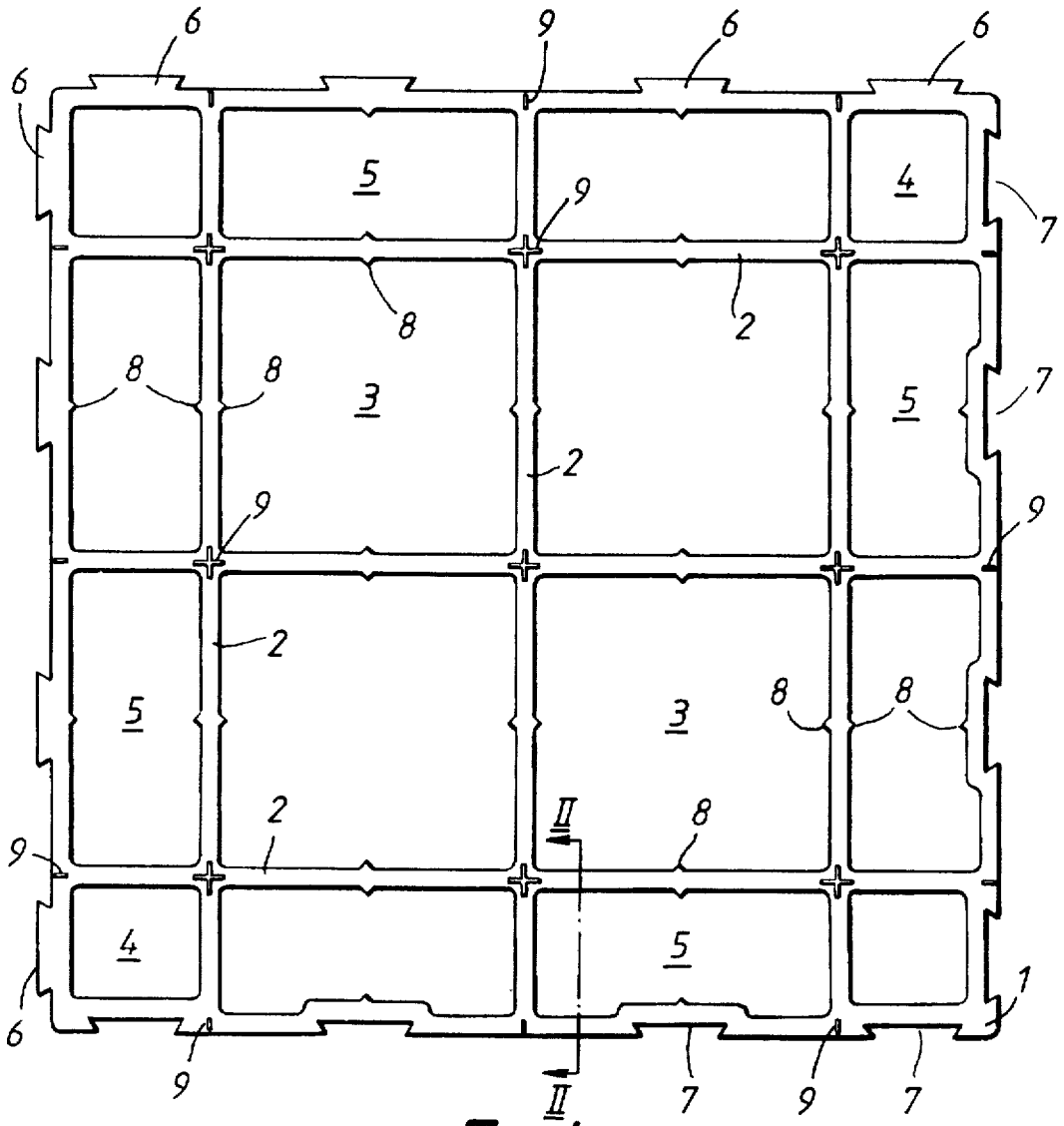
Figure 2:
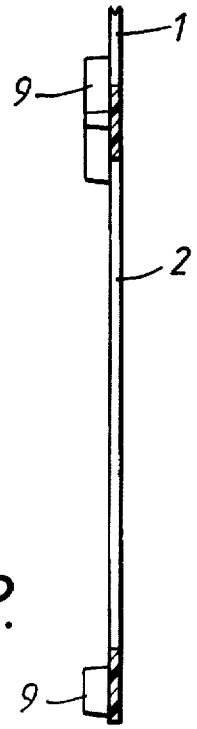
Figure 3:
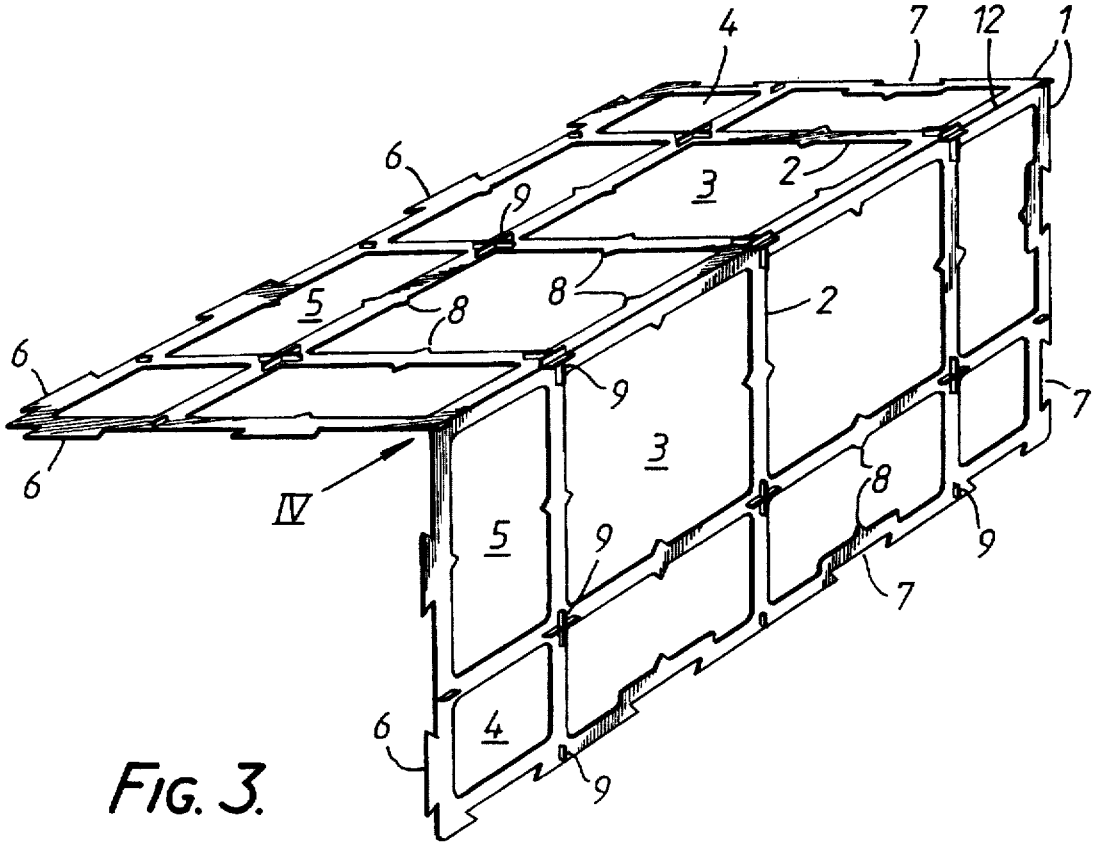

For a better understanding of the invention, and to show how the same may be carried into effect, reference will now be made, by way of example, to the accompanying drawings, in which:

FIG. 1 is a plan view of a relatively small area of a tiling system matrix constructed in accordance with the invention, FIG. 2 is a section, to an enlarged scale, taken on the line II—II in FIG. 1, FIG. 3 is a perspective view to substantially the same scale as FIG. 1 showing an area of the tiling system matrix constructed and arranged for tiling around a convex corner interconnecting two relatively perpendicular surfaces.

Figure 4:
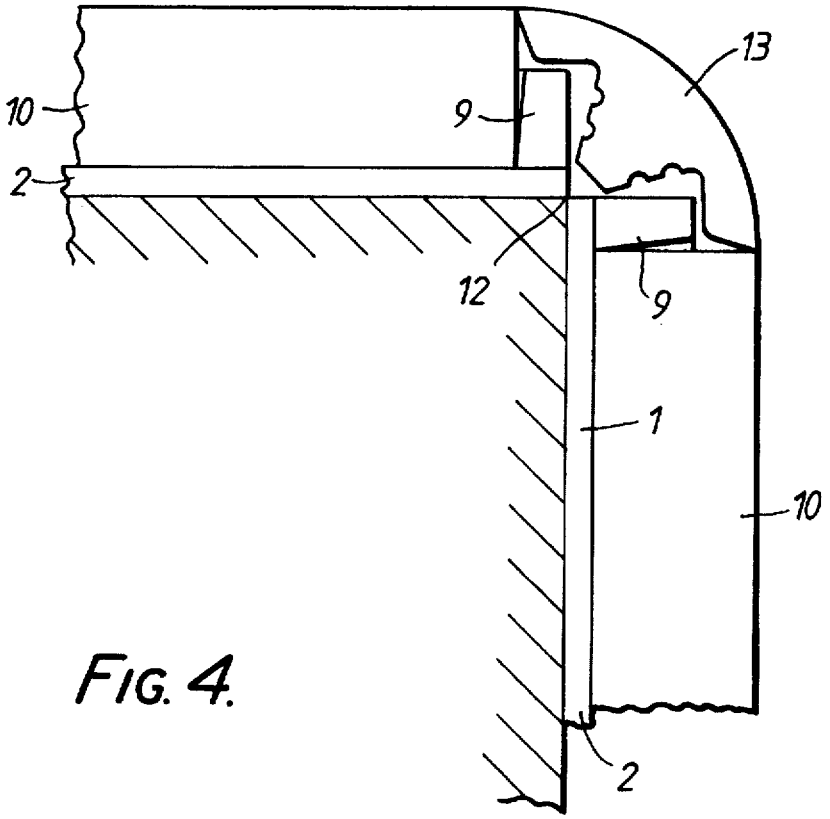
Figure 5:
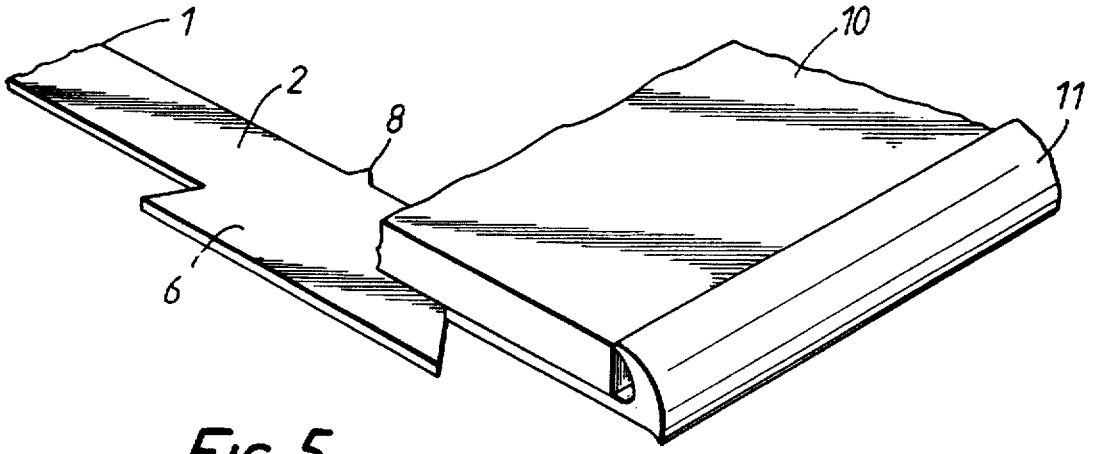

FIG. 4 is a view to a considerably enlarged scale as seen in the direction indicated by an arrow IV in FIG. 3 and shows the matrix area of FIG. 3 in use together with the employment of an auxiliary member to complete the tiling around the convex corner, and FIG. 5 is a perspective view to substantially the same scale as that of FIG. 2 showing one corner of an area of a matrix that may advantageously be employed along a free edge of a tiled region, part of one tile also appearing in FIG. 5.

Referring firstly to FIGS. 1 and 2 of the accompanying drawings, a relatively small area of a matrix 1 is illustrated that is intended for use in fastening standard 150 millimeter square (approximately 6×6 inches) glazed ceramic tiles to the surface of a vertical wall or, alternatively, to a horizontal or inclined surface. Such tiles conventionally have a thickness of approximately 5.0 millimeters but the thickness will vary with tile size and other factors. The matrix 1 could, of course, be dimensioned to co-operate with square tiles of other dimensions and/or to receive tiles in staggered rows or other patterns.

The matrix 1 is formed from a somewhat flexible, but substantially inelastic material which it is prefered should be a synthetic plastics material, an injection moulding grade of high impact polystyrene having been found to be very satisfactory for this purpose although the employment of other synthetic plastics materials or of alternative somewhat flexible, but inelastic, materials is by no means excluded. The matrix 1 defines an apertured portion 2 that, when in use on a flat surface, will be substantially planar, the portion 2 having a uniform thickness of substantially 1 millimeter and being formed throughout most of its area with a regular pattern of substantially square openings 3, at its four corners with four smaller substantially square openings 4, and along its edges, between the four corners, with a plurality of regularly spaced apart substantially oblong openings 5 whose lengths are the same as the widths, in parallel directions, of the substantially square openings 3.

FIG. 1 of the drawings show that, at regular intervals along each of two relatively perpendicular free edges of the illustrated area of matrix 1, each such edge exhibits a plurality of extensions 6 of broad dove-tailed configuration whilst, along the other two relatively perpendicular free edges of the same area of the matrix 1, a plurality of recesses 7 of broad dove-tailed shape are formed which recesses 7 exactly match the extensions 6 in size and shape. Each extension 6 and each recess 7 lies midway along the length of the outermost edge of the opening 4 or 5 which it immediately neighbours.

In addition to the extensions 6 and recesses 7 that are formed along the free edges of the area of matrix 1, each of the openings 3 is formed, midway along the length of each of its four edges, with relatively small V-shaped projections 8 and, similarly, each opening 5 is formed, midway along each of its two opposite and parallel longer edges, with further exactly similar projections 8. With this arrangement, there are straight rows of the projections 8 in exact alignment with the centres of extensions 6 and recesses 7 at opposite edges of the complete area of matrix 1, such rows thus being in exact parallel relationship with opposite basically straight edges of the matrix area 1 itself.

It can be seen in FIG. 1 of the drawings that each substantially oblong aperture 5 is a little less than half the size of each substantially square opening 3 and also that each smaller substantially square opening 4 is substantially one quarter the size of each larger substantially square opening 3.

One side of the matrix 1 is provided with a pattern of projections 9 that stand proud from said side by substantially 2.5 millimeters which height, it will be noted, is less than the minimum thickness of a standard glazed ceramic tile that will co-operate therewith. FIG. 1 of the drawings shows, at locations adjacent each corner of each substantially square opening 3, the projections 9 in a cruciform disposition which is not, however, essential. Instead of the four limbs of each cross being joined together as illustrated, said four limbs may be spaced apart from one another by a distance leaving a central region of each cross open or blank. Single projections 9 that correspond to one limb of one of the cruciform dispositions are arranged around the four free edges of the area of matrix 1 that is shown in FIG. 1 of the drawings, each such single projection 9 being perpendicular to, and being disposed immediately alongside, the edge concerned and having its length exactly in alignment with corresponding limbs of a row of the cruciform disposition projections 9.

In use, the flat side of the matrix 1 which is opposite to that bearing the projections 9 is secured to a wall or other surface that is to be tiled by employing an adhesive which may conveniently, but not essentially, be the same adhesive that is to be used for fastening the tiles themselves, a solvent-based neoprene contact adhesive or some other adhesive compatible with the material from which the matrix 1 is formed. If desired, this flat side, and/or the side of the matrix 1 bearing the projections 9, may be ribbed or otherwise roughened to improve its keying co-operation with any adhesive. It has already been emphasied that FIG. 1 of the drawings shows a relatively small area of the matrix 1 and it is possible for it to be produced in much larger areas, such as in sheets measuring 121.92 centimeters (4 ft.) long and 121.92 centimeters (4 ft.) wide. The inelastic flexibility of the matrix material is such that a sheet of the matrix having relatively large dimensions can be formed into a roll without permanent deformation but, for transport and handling generally, a flat configuration is usually more convenient. The use of relatively small areas of the matrix 1 is advantageous in regard to handling and storage and larger areas can, of course, be accurately produced merely by entering the extensions 6 of one "smaller" area into the matching recesses 7 of a neighbouring area. Across the junctions between correctly aligned areas of matrix 1 that are joined together in this way, two substantially oblong openings 5 and the material of the matrix 1 between them will effectively be equivalent to one of the larger substantially square openings 3 thus spacing apart cruciform disposition projections 9, across such a junction, by the same distance as the spacing between immediately neighbouring cruciform disposition projections 9 on a single area of the matrix 1. Similarly, two neighbouring smaller substantially square openings 4 effectively correspond to a single substantially oblong opening 5 and four such smaller substantially square openings 4 at the four adjoining corners of four areas of matrix 1 are equivalent to a single larger substantially square opening 3. There will inevitably be places at which some shaping of one or more areas of matrix 1 will be required to avoid obstructions on the surface to be tiled and this shaping can be quickly and easily effected using a strong and sharp pair of scissors.

The straight rows of projections 8 are very useful in lining up the areas of matrix 1 in parallel relationship with vertical and horizontal edges of walls, horizontal edges of floors and drawn or other lines relative to which the eventual rows of tiles must extend in as parallel relationship as possible. Using adhesive and, sometimes, scissors, it is usually possible to cover a wall or other surface with the matrix 1 quite quickly. If the tiling is to come to a free edge, then use may be made of an area of the matrix 1 such as that of which a small portion is shown in FIG. 5 of the drawings, such area being, if desired, in the form of a finishing strip of relatively narrow width. Whatever its formation, the area of matrix 1 that is shown in FIG. 5 has a lip 11 defining an outer convexly curved surface which stands proud from the apertured portion 2 of the matrix area 1 by a distance equal to the thickness of a tile 10, a part of one such tile 10 being shown in FIG. 5. It will immediately be seen from FIG. 5 that the lip 11 neatly finishes the free edge of the tiling without needing to employ known tiles that are specifically made for that purpose and which, along one edge, have a rounded and glazed extension of the flat glazed surface thereof.

The area of matrix 1 exhibiting the lip 11 can, if it is in the form of a finishing strip, be furnished in a width that will allow it to co-operate with one of the free edges of one matrix 1, such as that shown in FIG. 1 of the drawings, to produce, along that free edge, the spacing between the lip 11 and a parallel row of limbs of the nearest cruciform disposition projections 9 that is the same as the spacing between immediately neighbouring cruciform disposition projections 9 on the surface of a single area of the matrix 1. Since grouting is usually white in colour, it is desirable that any finishing strip or other area of matrix 1 that exhibits the lip 11 should be produced in that colour so that the eventual visibility of the lip 11 will not be inharmonious. Each finishing strip or other area of matrix 1 incorporating one of the lips 11 is provided with extensions 6 and/or recesses 7 to enable it to co-operate with the recesses 7 and/or extensions 6 of neighbouring areas of matrix 1. If desired, the lip 11 may define a shape other than the cylindrical convex curvature which is illustrated.

It may be that tiling is to be continued round, for example, a 90° convex angle between two vertical walls or between a vertical wall and a horizontal surface and it is possible to provide areas of the matrix 1 specifically adapted for that purpose. FIG. 3 of the drawings shows one such area, said area comprising two permanently interconnected sections that are moulded together with a relatively thin, and therefore relatively flexible, junction 12 between them which junction 12 will bend readily around any corner rendering the use of, for example, an adhesive tape unnecessary, such adhesive tape being employable, as an alternative, to join together two straight, or straightened by scissors, edges of two initially separate areas of matrix 1 that are to be secured to relatively inclined surfaces flanking an angular corner between those surfaces. It will be seen from FIG. 3 of the drawings that, alongside the flexible junction 12 between the two relatively inclined sections of areas of matrix 1, there are a plurality of T-shaped projections with the crossbar of each T extending along the free edge and the upright thereof perpendicularly away from that edge. Thus, tiles 10 can fit between cruciform disposition projections 9 and T-shaped projections 9 at either side of the junction 12 to locate those tiles 10 properly in much the same way as has already been described.

FIG. 4 of the drawings shows the matrix 1 in use around a 90° angle formed between two flat surfaces and shows the crossbars of T-shaped projections 9 standing proud from the matrix portions 2 at the adjacent edges of those portions 2 which flank the interconnecting flexible junctions 12. A tile quadrant 13 may be secured by tile adhesive and/or grouting around the corner between the tiles 10 flanking that corner. Alternatively, an extruded synthetic plastics quadrant 13 may take the place of ceramic quadrants 13 having glazed cylindrically curved surfaces. The angular junction between two walls or other surfaces might not be a 90° junction and glazed ceramic or synthetic plastics filling strips subtending angles of 45°, 60° and so on at their centres of curvature can be provided for employment in such situations. It is not, of course, essential that the exposed surface of each quadrant 13 or equivalent finishing strip should be a cylindrically curved surface and an oblique flat surface, an angular finish or some other desired shape can equally well be provided.

Once a wall or other surface that is to be tiled has been covered with the matrix 1, the tiles 10 will fit between the various projections 9 with a light frictional engagement or can be retained by a small, easily removable, quantity of adhesive, either arrangement allowing at least some of the tiles to be temporarily placed in their final positions before actually using a tiling adhesive to fix them permanently in those positions. This is particularly useful if a pattern of tiles is to be produced since it enables the tiles which bear the pattern elements or decorations on their surfaces to be temporarily installed to ensure that their relative spacing, clearance from the floor and the ceiling and so on, is exactly correct before finally fastening them in position together with the surrounding "plain" or contrast tiles. The tiles are installed in a substantially conventional manner merely by applying a proprietory tiling adhesive onto their rear surfaces and pressing them into position to spread that adhesive onto the wall or other surface itself, through the openings 3 and/or 4 and/or 5 and onto the exposed surface of the matrix 1 that surrounds those openings. The various projections 9 ensure that a substantially exactly uniform spacing between the tiles is automatically produced and this spacing is filled with proprietory or other grouting in a conventional manner by "wiping" it into the spaces between the tiles and using a damp cloth or the like or a proprietory tool to remove any excess left on the glazed surfaces of the tiles. It will be remembered that the projections 9 have a height which is less than the minimum thickness of the tiles 10 so that the grouting over the projections 9 have a height which is less than the minimum thickness of the tiles 10 so that the grouting over the projections 9 will conceal them.

At a 90° angular corner between two walls, as discussed above, the crossbars of the T disposition projections 9 both provide the correct spacing, and act as a guide, for the installation of the ceramic tile quandrants 13 (FIG. 4) or an equivalent synthetic plastics extrusion either of which may be provided in a range of different colours to match, or contrast with, the colours of the neighbouring tiles 10. Alternatives to the use of the thin synthetic plastics junction 12 that flexibly interconnect two matrix portions 2 include the employment of the previously mentioned thin flexible adhesive tape to join said portions 2 together in the manner of a hinge or providing small projections along the edge of one portion 2 and recesses of matching widths along the co-operating edge of the other portion 2 so that, when the two portions 2 are disposed in a manner equivalent to that illustrated in FIGS. 3 and 4 of the drawings, the projections along one edge will fit in the recesses along the outer edge to provide a correct location of the matrix 1 around the angular corner. A still further possibility is to provide alternate projections and recesses along one edge to co-operate with alternate recesses and projections along the other edge. The projections may be of such an extent that they will stand proud of the surface of the matrix portion 2 having the edge recesses into which said projections are entered so that the latter can then serve a similar function to the crossbars of the T-shaped projections 9 although, with this arrangement, the shape of the ceramic quandrants 13 or equivalent synthetic plastics extrusions will need to be modified to co-operate correctly therewith.

The desired and illustrated arrangement of the extensions 6, recesses 7 and projections 8 is by no means essential; the extensions 6 and recesses 7 may be given other co-operating shapes but it is preferred that those shapes should be arranged to interlock with one another. The projections 8 serve merely for alignment purposes and any alternative shapes which will satisfactorily accomplish this may equally well be used. The spacing between the projections 9 and the shapes and sizes of the openings 3, 4 and 5 can readily be changed to enable oblong or other tiles to be used instead of square tiles or for co-operation with square tiles of sizes which differ from the frequently employed wall tile size that is mentioned above.

Although rarely employed, even tiles of shapes other than rectangular could be used, needing only to co-operate with appropriate shapes and dispositions of the projections 9 and of the openings in the portions 2 of the matrix 1. Purely as examples, triangular, hexagonal or circular tiles could advantageously be mounted by a system in accordance with the invention. Clearly, the shapes of the openings 3, 4 and 5 that are shown in the drawings are far from being essential although the illustrated shapes are probably the most economic as regards use of the material from which the matrix 1 is formed. Nevertheless, circular, octagonal or other openings could be used in place of the openings 3 and 4 and oval or irregular octagonal openings in place of the oblong openings 5.

In addition to serving for alignment purposes, the projections 8 can be of considerable assistance in providing guidance for cutting of the matrix 1 where, purely for example, a finishing strip is to be used along-side a portion of the matrix 1, the finishing strip being arranged as briefly described with reference to FIG. 5 of the drawings. It is now conventional to produce new buildings, and to alter existing buildings, employing pre-fabricated wall panels and one aspect of the invention involves incorporating areas of the matrix 1 of this tiling system into such pre-fabricated panels so that, after installation, the panels are immediately ready for tiling. Even when this work is to be done by an experienced professional tiler, the use of the system is of considerable benefit, particularly if a pattern of tiles is to be installed or a number of "picture" tiles with a plain surround.

The system which has been described enables even the rankest amateur tiler to produce large areas of finished tiling both relatively quickly and relatively easily with an absolute minimum of blemishes and irregularities, particularly as regards the grouted spacing between the installed tiles.

Whilst the invention has been described principally in regard to the tiling of walls, it will immediately be apparent that it is used in substantially the same way, and with the same benefits, in the tiling of ceilings, floors and inclined surfaces. The system is not confined to employment with glazed ceramic tiles and is of equal assistance when installing synthetic plastics, cork, non-glazed and other tiles. Since the matrix 1 is inextensibly flexible, it can be used in the tiling of both concave and convex curved walls or other surfaces as well as for the tiling of strictly planar surfaces.

Instead of the projections 9 being integral with, or fixedly secured to the portions 2 of the matrix 1, each such portion may be formed with a pattern of relatively small, round, cruciform or other holes and initially separate projections 9 may be positioned on the portions 2, using these holes, to suit the size of tiles to be installed by the system. With this arrangement, the projections 9 can be installed at different points enabling the same matrix 1 to be adjusted for use with tiles of various sizes. Provisions may be made to produce the matrix 1 in strip form to allow a continuous "spacer" to be inserted between the matrix strips. The openings 3, 4 and 5 may receive portions of tile mosaic in which several relatively small tiles are secured to a backing sheet.

We claim:

[1. A tiling system which comprises the provision of a first matrix for use in tiling, the first matrix defining an apertured portion for adhesive attachment to a surface to be tiled, the apertures constituting a major portion of the area of the first matrix, the apertured portion being provided with a pattern of projections, the sizes and positions of the projections enabling tiles to be fit between the projections, the projections of the patterns being detachably secured to the apertured portion, the configuration of the apertured portion being symmetrical, the configuration having at least one central aperture, a plurality of lateral apertures, and a plurality of corner apertures, the lateral apertures and the corner apertures surrounding the central aperture, a combined matrix being formed when the first matrix is attached and aligned along a common edge to a second matrix, the second matrix being identical to the first matrix, the configuration of the combined matrix being similar to the configuration of the first matrix, a lateral aperture of the first matrix combining with a lateral aperture of the second matrix along the common edge to form a central aperture, and a corner aperture of the first matrix combining with a corner aperture of the second matrix along the common edge to form a lateral aperture.]

*2. In combination with a plurality of rectilinear tiles of predetermined dimensions for use in the tiling of a surface, at least a pair of tiling matrices each matrix having an apertured portion defining apertures which consitute a major portion of the area of the matrix and are to receive tiles to be adhered to the surface, characterized in that the apertured portion is a two-dimensional framework formed of a flexible but substantially inextensible synthetic plastic material and comprising a peripheral frame and horizontal and vertical frame members intersecting at right angles to each other and defining apertures therebetween, the framework defining a central zone containing at least one central aperture of a rectilinear form and at least one lateral aperture having a rectilinear form which substantially corresponds to the size and shape of half a said central aperture and which flank central zone outer edge-located edges of the central aperture, and each corner of the central zone substantially coinciding with one corner of a corresponding corner aperture within the framework and having a rectilinear form which substantially corresponds to the size and shape of one quarter of a said central aperture, the frame members making up the apertured portion carrying thereon a pattern of projections at frame member intersecting positions whose shapes and positions are such that tiles can either fit between projections to lie entirely within the matrix or tiles can fit between projections and bridge adjacent matrices, with the frame members being so narrow that between edges thereof and the projections a narrow band of the frame member exists acting as a ledge for supporting an edge region of a tile while allowing substantially the entire portion of the tile within such edge regions thereof to be unsupported by the matrix, for the tiles to be adhesively secured directly to said surface within the respective aperture or apertures therein while being spaced apart from one another by said projections to facilitate uniform grouting between the tiles, projection and recess means respectively being provided along frame members defining the peripheral frame of the matrix area to assist in interlocking the matrix relative to an adjacent matrix against displacement therebetween in any one direction during the installation of the matrix on a surface that is to be tiled and laying the tiles thereon, said combination characterized in that said tiles have an area which is an even integer multiple of said central aperture and the projections on each matrix are initially separate from the apertured portions, said portions and said projections being provided with cooperating means that will enable the projections to be attached to the portions in positions that are appropriate to the size of the particular tiles that are to cooperate with each matrix.*

*3. A tiling system which comprises the provision of a first matrix for use in tiling, the first matrix defining an apertured portion for adhesive attachment to a surface to be tiled, the apertures constituting a major portion of the area of the first matrix and being intended to receive tiles to be adhered to a surface, characterized in that the apertured portion is a two dimensional framework formed of a flexible but substantially inextensible synthetic plastic material and comprising a peripheral frame and horizontal and vertical frame members intersecting at right angles to each other and defining apertures therebetween, the apertured portion being provided with a pattern of projections at frame member intersecting positions, the sizes and positions of the projections enabling tiles to fit between the projections, the projections of the pattern being fixedly or detachably secured to the apertured portion, the configuration of the apertured portion being symmetrical, the frame having at least one central aperture, a plurality of lateral apertures of rectilinear form which corresponds to the size and shape of half a said central aperture and which flank central zone outer edge-located edges of the central aperture, and a plurality of corner apertures surrounding the central aperture, with the corner apertures each coinciding at one corner with one corner of said central aperture, the corner apertures being of rectilinear form which substantially corresponds to the size and shape of one quarter of a said central aperture, with the frame members being so narrow that, between the edges thereof and the projections, a narrow band of the frame member exists acting as a ledge for supporting an edge region of a tile while allowing substantially the entire portion of the tile within such edge regions to be unsupported by the matrix, a combined matrix being formed when the first matrix is attached and aligned along a common edge to a second matrix, the second matrix being identical to the first matrix, such that a lateral aperture of the first matrix combines with a lateral aperture of the second matrix along the common edge to form a central aperture, and a corner aperture of the first matrix combines with a corner aperture of the second matrix along the common edge to form a lateral aperture, whereby tiles may be adhesively secured to said surface within the respective aperture or apertures therein while being spaced apart from one another by said projection to facilitate uniform grouting between the tiles, projections and recess means respectively being provided along frame members defining the peripheral frame of the matrix area to assist in interlocking of the matrices against displacement therebetween in any one direction during the installation of the matrix on a surface that is to be tiled and laying of tiles thereon.*

* * * * *